United States Patent
Lin et al.

(10) Patent No.: US 9,877,341 B2
(45) Date of Patent: Jan. 23, 2018

(54) MULTI-SUBFRAME SCHEDULING METHOD, DEVICE AND SYSTEM

(71) Applicant: ZTE CORPORATION, Shenzhen, Guangdong Province (CN)

(72) Inventors: Zhirong Lin, Shenzhen (CN); Bo Dai, Shenzhen (CN); Shuqiang Xia, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 85 days.

(21) Appl. No.: 14/784,434

(22) PCT Filed: Mar. 13, 2014

(86) PCT No.: PCT/CN2014/073355
§ 371 (c)(1),
(2) Date: Oct. 14, 2015

(87) PCT Pub. No.: WO2014/169739
PCT Pub. Date: Oct. 23, 2014

(65) Prior Publication Data
US 2016/0066343 A1 Mar. 3, 2016

(30) Foreign Application Priority Data

Apr. 17, 2013 (CN) .......................... 2013 1 0133220

(51) Int. Cl.
*H04W 4/00* (2009.01)
*H04W 72/12* (2009.01)
(Continued)

(52) U.S. Cl.
CPC ....... *H04W 72/1289* (2013.01); *H04L 5/0044* (2013.01); *H04L 5/0055* (2013.01);
(Continued)

(58) Field of Classification Search
CPC ......... H04W 72/1289; H04W 72/1205; H04W 72/1268; H04L 5/0055; H04L 5/0044; H04L 5/1469
See application file for complete search history.

(56) References Cited

U.S. PATENT DOCUMENTS

| | | | |
|---|---|---|---|
| 2012/0127938 A1* | 5/2012 | Lv ..................... | H04W 72/1205 370/329 |
| 2014/0204863 A1* | 7/2014 | Wu ..................... | H04L 25/0232 370/329 |

(Continued)

FOREIGN PATENT DOCUMENTS

| | | |
|---|---|---|
| CN | 101742626 A1 | 6/2010 |
| CN | 102137504 A1 | 7/2011 |

(Continued)

OTHER PUBLICATIONS

International Search Report and Written Opinion dated May 28, 2014 in PCT Application No. PCT/CN2014/073355.

*Primary Examiner* — Clemence Han
(74) *Attorney, Agent, or Firm* — Plumsea Law Group, LLC

(57) ABSTRACT

A multi-subframe scheduling method, device and system are disclosed. The method includes: a base station side scheduling transmission of a plurality of subframes through a piece of downlink control information DCI; and according to an acquired multi-subframe scheduling mode and scheduling parameters, a user equipment UE receiving and sending the plurality of subframes according to an indication of the DCI.

20 Claims, 4 Drawing Sheets

(51) Int. Cl.
*H04L 5/00* (2006.01)
*H04L 5/14* (2006.01)
(52) U.S. Cl.
CPC ... *H04W 72/1205* (2013.01); *H04W 72/1268* (2013.01); *H04L 5/1469* (2013.01)

(56) References Cited

U.S. PATENT DOCUMENTS

| | | | | |
|---|---|---|---|---|
| 2014/0301299 | A1* | 10/2014 | Wu | H04L 5/0053 370/329 |
| 2016/0029250 | A1* | 1/2016 | Yi | H04W 48/12 370/329 |
| 2016/0142898 | A1* | 5/2016 | Poitau | H04W 72/0413 370/329 |

FOREIGN PATENT DOCUMENTS

| | | |
|---|---|---|
| CN | 102325377 A1 | 1/2012 |
| CN | 102625456 A1 | 8/2012 |
| WO | 2010133043 A1 | 11/2010 |

* cited by examiner

MULTI-SUBFRAME SCHEDULING METHOD, DEVICE AND SYSTEM

CROSS-REFERENCE TO RELATED APPLICATION(S)

This application is the U.S. National Phase application of PCT application number PCT/CN2014/073355 having a PCT filing date of Mar. 13, 2014, which claims priority of Chinese patent application 201310133220.7 filed on Apr. 17, 2013, the disclosures of which are hereby incorporated by reference.

TECHNICAL FIELD

The present document relates to the mobile communication technology, and particularly, to a multi-subframe scheduling method, device and system.

BACKGROUND OF THE RELATED ART

Uplink physical channels of a Long Term Evolution (LTE) system include: a Physical Random Access Channel (PRACH), a Physical Uplink Shared Channel (PUSCH) and a Physical Uplink Control Channel (PUCCH). The single carrier Orthogonal Frequency Division Multiplexing (OFDM) technology is used in the uplink of the LTE, reference signals and data are multiplexed by means of Time Division Multiplexing (TDM).

And downlink physical channels of the LTE system include: a Physical Downlink Shared Channel (PDSCH), a Physical Downlink Control Channel (PDCCH), a Physical Broadcast Channel (PBCH), a Physical Multicast Channel (PMCH), a Physical Control Format Indicator Channel (PCFICH), a Physical Hybrid ARQ Indicator Channel (PHICH) and an Enhanced Physical Downlink Control Channel (EPDCCH).

In the LTE system, uplink control information is transmitted by a PUCCH and downlink control information is transmitted by a PDCCH. Wherein, the PUCCH is used for transmitting Uplink Control Information (UCI), the UCI includes a Scheduling Request (SR), positive acknowledgement/negative acknowledgement (HARQ-ACK/NACK) of a Physical Downlink Shared Channel (PDSCH) and downlink Channel State Information (CSI) fed back by User Equipment (UE). Wherein, the CSI includes three forms: a Channel Quality Indication (CQI), a Precoding Matrix Indicator (PMI) and a Rank Indication (RI). Sending of the CSI includes two ways: periodic CSI and aperiodic CSI, wherein the periodic CSI is that, after an Evolved-Node B (eNB) performs configuration through upper layer signaling, the UE sends the CSI in a fixed way according to a certain time interval, and the aperiodic CSI is that the eNB performs triggering through DCI, and the UE performs sending after receiving the DCI.

In the LTE system, uplink reference signals are divided into a Demodulation Reference Signal (DMRS) and a Sounding Reference Signal (SRS). Wherein, the DMRS is divided into a PUCCH-specific demodulation reference signal and a PUSCH-specific demodulation reference signal, which are respectively used for different channel transmissions. The DMRS is mainly used for estimation of uplink channels and coherent detection and demodulation of the eNB base station terminal; and the SRS is mainly used for measurement of the uplink channels, so that the eNB performs frequency selectivity scheduling. In order to support such frequency selectivity scheduling, the UE is required to perform measurement on larger bandwidths, and generally it will exceed the bandwidth of the data transmission, therefore, the SRS is a "broadband" reference signal. The SRS is divided into two kinds: a periodic SRS and an aperiodic SRS, wherein, the periodic SRS is an SRS configured by the system and sent according to a certain period, and the aperiodic SRS is triggered by the base station through DCI and is sent after the UE receives the DCI of the base station triggering the aperiodic SRS.

The PDCCH is used for transmitting Downlink Control Information (DCI), the DCI is mainly used for scheduling the PDSCH and PUSCH, that is, after receiving the DCI, the UE receives the PDSCH sent from an Evolved-Node B (eNB) according to an indication of the DCI, or sends the PUSCH to the eNB according to the indication of the DCI. The DCI mainly includes: resource indication information (Resource block assignment), a Modulation and Coding Scheme (MCS), a Downlink Assignment Index (DAI), a Channel State Information request, a Cyclic shift for DMRS and Orthogonal Cover Code (OCC) index and a Transport Block Size (TBS) and so on. After receiving the above DCI, the UE receives the PDSCH sent from the eNB according to indication information in the DCI, or sends the PUSCH to the eNB.

The above TBS represents a size of a transport block, in the LTE system, in order to improve the system spectrum efficiency, the Multiple-Input Multiple-Output (MIMO) technology is introduced, that is, multi-antenna units are used at both a sending end and a receiving end of a wireless system, with abundant space multidimensional characteristics of wireless scatter channels, it is to work by means of multiple-input end/multiple-output end, thereby achieving an effect of improving the system channel capacity. After the MIMO is introduced, each carrier supports multiplex transmission of a plurality of Transport Blocks (TBs), and in this case, the eNB is also required to notify the UE of a TBS of each TB.

And when the UE is scheduled to send uplink subframes through the DCI, the DAI is called as an uplink DAI (UL DAI), which is used for representing the number of ACKs required to be fed back in the uplink subframes that will be sent by the UE; and when the UE is scheduled to receive downlink subframes through the DCI, the DAI is called as a downlink DAI (DL DAI), which is used for representing that a currently received subframe is which downlink subframe that is scheduled in a scheduling window.

In the LTE system in the related art, scheduling includes two kinds: dynamic scheduling and semi-persistence scheduling. Wherein, the dynamic scheduling is: the eNB scheduling the UE according to the related communication requirements, that is, the eNB sending a piece of DCI, and the UE receiving one PDSCH or sending one PUSCH according to the current DCI; the semi-persistence scheduling (SPS) is: the eNB activating the semi-persistence scheduling through the DCI, after the semi-persistence scheduling is activated, the UE receiving the PDSCH or sending the PUSCH according to a fixed interval, and the eNB not needing to give a notification through the DCI until the eNB deactivates the semi-persistence scheduling through the DCI, moreover, in the LTE standard in the related art, the maximum MCS of the SPS scheduling is limited to 15.

In the LTE system, at present, in the dynamic scheduling, a piece of DCI can only trigger the UE to receive one PDSCH or send one PUSCH. However, in fact, with respect to a low-speed mobile user, when the user has continuous data to be transmitted, if the same scheduling parameter can be used in a plurality of subframes to perform transmission, at this point, the control overhead of the dynamic transmission will be higher, thereby reducing the system performance; and in the SPS scheduling, due to the limitation that the maximum MCS is 15, high order modulation cannot be used at present, thus user transmission with a larger data volume cannot be supported.

SUMMARY OF THE INVENTION

The embodiments of the present document provide a multi-subframe scheduling method, device and system, which can reduce control overhead of the scheduling in the base station, and provide higher spectrum efficiency for users, thereby supporting user transmission with a larger data volume.

The embodiment of the present document discloses a multi-subframe scheduling method, which comprises:

a base station side scheduling transmission of a plurality of subframes through a piece of downlink control information DCI; and according to an acquired multi-subframe scheduling mode and scheduling parameters, a user equipment UE receiving and sending the plurality of subframes according to an indication of the DCI.

The base station side scheduling transmission of a plurality of subframes through a piece of DCI comprises:

the base station side scheduling a plurality of uplink subframes or downlink subframes at a time through a piece of DCI; and the base station side sending data in the plurality of downlink subframes scheduled, or receiving data in the plurality of uplink subframes scheduled.

The UE receiving and sending the plurality of subframes according to an indication of the DCI comprises:

in accordance with the acquired multi-subframe scheduling mode and scheduling parameters, according to the indication of the DCI, the UE receiving data of the plurality of downlink subframes scheduled, or sending data of the plurality of uplink subframes scheduled.

The method further comprises: the UE acquiring the multi-subframe scheduling mode and scheduling parameters, which comprises:

the base station side and the UE pre-appointing the multi-subframe scheduling mode and scheduling parameters;

and/or, the base station side sending the multi-subframe scheduling mode and scheduling parameters to the UE through upper layer signaling;

and/or, the base station side indicating the multi-subframe scheduling mode and scheduling parameters in the DCI sent to the UE.

The method further comprises the UE acquiring the multi-subframe scheduling mode and scheduling parameters: the base station side and the UE pre-appointing the multi-subframe scheduling mode and scheduling parameters.

The method further comprises the UE acquiring the multi-subframe scheduling mode and scheduling parameters: the base station side sending the multi-subframe scheduling mode and scheduling parameters to the UE through upper layer signaling.

The method further comprises the UE acquiring the multi-subframe scheduling mode and scheduling parameters: the base station side indicating the multi-subframe scheduling mode and scheduling parameters in the DCI sent to the UE.

The scheduling mode is a base station scheduling a plurality of continuous subframes, and the scheduling parameters include a number of subframes scheduled.

The scheduling mode is a base station scheduling a plurality of discontinuous subframes, and the scheduling parameters include subframe intervals of a plurality of subframes scheduled and a total number of subframes scheduled.

Scheduling parameters of all subframes scheduled are identical; or, the base station indicates changes of scheduling parameters of user data in different subframes through the indication of the DCI.

The UE and the base station side pre-appoint an adjustment step size and an adjustment condition for the scheduling parameters; the method further comprises:

the UE automatically adjusting the scheduling parameters according to the adjustment step size, according to the adjustment condition;

when the base station schedules the UE to receive a physical downlink shared channel PDSCH, the base station adjusting parameters of a plurality of PDSCHs scheduled according to the adjustment condition, and the UE receiving the PDSCH according to an appointment with the base station.

The scheduling mode is the plurality of subframes scheduled containing different types of subframes, and a way for processing the different types of subframes.

The way for processing the different types of subframes comprises: only scheduling subframes of a same type in the multi-subframe scheduling, or selecting scheduled subframes based on a transmission mode.

The different types of subframes mean that: signal contents borne by the subframes are different, or types of subframes are different.

The different types of subframes comprise: a subframe with uplink control information UCI transmission and a subframe without UCI transmission; and/or a multicast broadcast single frequency network MBSFN subframe and a non-MBSFN subframe; and/or a semi-persistence scheduling SPS subframe and a non-SPS subframe; and/or a subframe with sounding reference signal SRS transmission and a subframe without SRS transmission.

The plurality of subframes scheduled contain SPS subframes and subframes with aperiodic channel state information CSI transmission;

the scheduling mode is that: the SPS subframe can only be scheduled by means of single-frame scheduling; or, activation and release of the SPS subframe can only be scheduled by means of single-frame scheduling, but an SPS subframe in an activated period can be scheduled by means of multi-subframe scheduling; or, aperiodic CSI cannot be triggered through the multi-subframe scheduling; or, the subframes in the multi-subframe scheduling contain SPS and aperiodic CSI subframes, and the SPS subframe and aperiodic CSI subframes are located in preset appointed locations in the subframes scheduled.

The method further comprises: according to a preset condition, determining whether the plurality of subframes scheduled contain the SPS subframe;

the preset condition comprises: whether the DCI is scrambled by semi-persistence scheduling radio network temporary identification SPS RNTI; a way for determining comprises: if it is judged that the DCI is scrambled by the SPS RNTI, the plurality of subframes containing the SPS subframe; and the preset condition comprises: whether a location of the SPS subframe is in the plurality of subframes scheduled; a way for determining comprises: if it is judged that the location of the SPS subframe is in the plurality of subframes scheduled, the plurality of subframes containing the SPS subframe.

When the subframes in the multi-subframe scheduling contain the SPS subframe, and the DCI supports multi-stream transmission, a way for determining a transport block TB index of the SPS subframe comprises:

data of the SPS subframe corresponding to a preset TB index; or, the base station side indicating the TB index corresponding to the data of the SPS subframe through signaling.

The subframes in the multi-subframe scheduling contain the SPS subframe, a way for determining a transport block size TBS of the SPS subframe comprises:

the TBS of the SPS subframe and TBSs of the other subframes scheduled being determined according to a preset proportion; or, the TBS of the SPS subframe being a pre-appointed fixed value.

When the subframes in the multi-subframe scheduling contain UCI or an aperiodic CSI subframe, a way for determining a TBS of the aperiodic CSI subframe comprises:

a TBS of a subframe in which the UCI is located and a TBS of a subframe in which aperiodic CSI is located being in a preset proportion relationship with the other subframes scheduled; or, being preset as 0; or, when the DCI supports multi-stream transmission, using a preset fixed codebook and port; or, the TBS of the subframe in which the UCI is located being a pre-appointed fixed value.

In a time division duplexing TDD system, an uplink downlink assignment index UL DAI and the plurality of subframes scheduled satisfy that:

the UL DAI corresponds to a positive acknowledgement information HARQ-ACK feedback of a physical downlink shared channel of a first uplink subframe in the multi-subframe scheduling;

or, the UL DAI corresponds to an uplink subframe corresponding to a largest number of downlink subframes in the plurality of uplink subframes scheduled;

or, the UL DAI is applied to all uplink subframes, each subframe corresponds to a preset same value;

or, the UL DAI corresponds to a preset group of downlink assignment index DAI values.

In the TDD system, a downlink assignment index DL DAI value corresponds to an initial subframe scheduled;

DL DAI values of subframes scheduled subsequently are acquired by calculating from a DL DAI of the initial subframe by means of accumulation, and after exceeding a preset scheduling window, a recalculation is made.

The embodiment of the present document further provides a multi-subframe scheduling system, which comprises: a base station side and a user equipment UE, wherein, the base station side is configured to: schedule transmission of a plurality of subframes through a piece of downlink control information DCI; and the UE is configured to: according to an acquired multi-subframe scheduling mode and scheduling parameters, receive and send the plurality of subframes according to an indication of the DCI.

The base station side is configured to: schedule a plurality of uplink subframes or downlink subframes at a time through a piece of DCI, and send data in the plurality of downlink subframes scheduled, or receive data in the plurality of uplink subframes scheduled.

The UE comprises an acquisition unit and a transceiving unit, wherein, the acquisition unit is configured to: acquire the multi-subframe scheduling mode and scheduling parameters;

the transceiving unit is configured to: in accordance with the acquired multi-subframe scheduling mode and scheduling parameters, according to the indication of the DCI, receive data of the plurality of downlink subframes scheduled, or send data of the plurality of uplink subframes scheduled.

The acquisition unit is configured to: pre-appoint the multi-subframe scheduling mode and scheduling parameters with the base station side; and/or acquire the multi-subframe scheduling mode and scheduling parameters from the base station side through upper layer signaling; and/or acquire the multi-subframe scheduling mode and scheduling parameters from the indication of the DCI from the base station side.

The embodiment of the present document further provides a multi-subframe scheduling device, which is configured at a base station side, and configured to: schedule a plurality of uplink subframes or downlink subframes at a time through a piece of downlink control information DCI, and make the base station side send data in the plurality of downlink subframes scheduled, or receive data in the plurality of uplink subframes scheduled.

The embodiment of the present document further provides a multi-subframe scheduling device, which is configured at a user equipment UE side, and configured to: according to an acquired multi-subframe scheduling mode and scheduling parameters, receive and send a plurality of subframes according to an indication of downlink control information DCI.

The device comprises: an acquisition unit and a transceiving unit, wherein, the acquisition unit is configured to: acquire the multi-subframe scheduling mode and scheduling parameters; and the transceiving unit is configured to: in accordance with the acquired multi-subframe scheduling mode and scheduling parameters, according to the indication of the DCI, receive data of the plurality of downlink subframes scheduled, or send data of the plurality of uplink subframes scheduled.

The acquisition unit is configured to: pre-appoint the multi-subframe scheduling mode and scheduling parameters with a base station side; and/or acquire the multi-subframe scheduling mode and scheduling parameters from the base station side through upper layer signaling; and/or acquire the multi-subframe scheduling mode and scheduling parameters from the indication of the DCI from the base station side.

The embodiment of the present document further provides a multi-subframe scheduling method, which comprises: a base station side scheduling a plurality of uplink subframes or downlink subframes at a time through a piece of downlink control information DCI, and the base station sending data in the plurality of downlink subframes scheduled, or receiving data in the plurality of uplink subframes scheduled.

The embodiment of the present document further provides a multi-subframe scheduling method, which comprises: in accordance with an acquired multi-subframe scheduling mode and scheduling parameters, according to an indication of downlink control information DCI, a user equipment UE receiving data of a plurality of downlink subframes scheduled, or sending data of a plurality of uplink subframes scheduled.

The method further comprises: the UE acquiring the multi-subframe scheduling mode and scheduling parameters, which comprises:

the UE pre-appointing the multi-subframe scheduling mode and scheduling parameters with a base station side; and/or, the UE acquiring the multi-subframe scheduling mode and scheduling parameters from the base station side through upper layer signaling; and/or, the UE acquiring the multi-subframe scheduling mode and scheduling parameters from the indication of the DCI from the base station side.

The embodiments of the present document provide and comprise: a base station side scheduling transmission of a plurality of subframes through a piece of DCI, and according to the acquired multi-subframe scheduling mode and scheduling parameters, a UE receiving and sending the plurality of subframes according to an indication of the DCI. In the present document, by using the multi-subframe scheduling method, control overhead of the scheduling in the base station is reduced, which provides higher spectrum efficiency for users, thereby supporting user transmission with a larger data volume.

BRIEF DESCRIPTION OF THE DRAWINGS

Here, the described accompanying drawings are used to provide an understanding of the present document and constitute a part of the present document. The schematic embodiments and illustrations thereof of the present document are used to explain the present document, but do not constitute an inappropriate limitation on the present document. In the drawings.

PREFERRED EMBODIMENTS OF THE INVENTION

Figure 1:
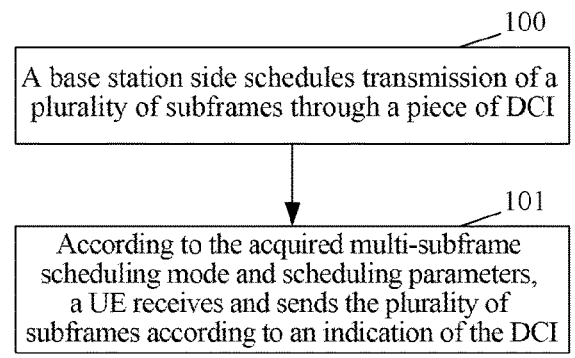
FIG. 1 is a flow chart of a multi-subframe scheduling method according to the embodiment of the present document.

FIG. 1 is a flow chart of a multi-subframe scheduling method according to the embodiment of the present document, and as shown in FIG. 1, the following steps are included.

In step 100, a base station side schedules transmission of a plurality of subframes through a piece of DCI.

In the step, the base station side schedules a plurality of uplink subframes or downlink subframes at a time through a piece of DCI, and the base station side sends data in the plurality of downlink subframes scheduled, or receives data in the plurality of uplink subframes scheduled.

In step 101, according to the acquired multi-subframe scheduling mode and scheduling parameters, a UE receives and sends the plurality of subframes according to an indication of the DCI.

In the step, in accordance with the acquired multi-subframe scheduling mode and scheduling parameters, according to the indication of the DCI, the UE receives data of the plurality of downlink subframes scheduled, or sends data of the plurality of uplink subframes scheduled.

Before the step, it also includes the UE acquiring the multi-subframe scheduling mode and scheduling parameters, and a specific way includes: the base station side and the UE pre-appointing the multi-subframe scheduling mode and scheduling parameters, and/or the base station side sending the multi-subframe scheduling mode and scheduling parameters to the UE through upper layer signaling, and/or the base station side indicating the multi-subframe scheduling mode and scheduling parameters in the DCI. Specifically:

in step 101, the UE acquiring the multi-subframe scheduling mode and scheduling parameters is: the base station side and the UE pre-appointing the multi-subframe scheduling mode and scheduling parameters, that is, setting various scheduling modes with regard to multi-subframe scheduling and scheduling parameters corresponding to all the scheduling modes at the base station side and the UE respectively in advance. Specific descriptions will be made through the examples below.

(1) The preset scheduling mode is the base station scheduling a plurality of continuous subframes, and the preset scheduling parameters will indicate the number of subframes scheduled.

(2) The preset scheduling mode is the base station scheduling a plurality of discontinuous subframes, and the preset scheduling parameters will indicate subframe intervals of the plurality of subframes scheduled and the total number of subframes scheduled.

(3) With respect to scheduling parameters of a plurality of subframes, it can be preset as that:

it is to keep the scheduling parameters of all subframes scheduled identical;

or, it is to indicate changes of scheduling parameters of user data in different subframes by means of the indication of the DCI;

or, the UE and the base station side pre-appoint an adjustment step size and an adjustment condition for the scheduling parameter, therefore, when the base station schedules the UE to send a PUSCH, the UE automatically adjusts the scheduling parameter according to the appointed adjustment step size, according to the appointed adjustment condition; and when the base station schedules the UE to receive a PDSCH, the base station adjusts parameters of a plurality of PDSCHs scheduled according to the appointed adjustment condition, and the UE receives the PDSCH according to an appointment with the base station. Here, the base station side can indicate whether the automatic adjustment is allowed through the upper layer signaling or DCI.

The scheduling parameters include all the scheduling parameters contained in the indication of the DCI.

(4) The preset scheduling mode is the plurality of subframes scheduled containing different types of subframes, and the preset scheduling mode also will indicate a way of how to process, for example, only the subframes of the same type are scheduled in the multi-subframe scheduling, or scheduled subframes are selected based on a transmission mode, that is, according to the transmission mode of the subframe, it is to select whether to schedule subframes based on different transmission modes and so on. Here, different types of subframes can be that signal contents borne by the subframes are different, or types of subframes are different and so on.

Wherein, different types of subframes can be but not limited to the following divisions: a subframe with UCI transmission and a subframe without UCI transmission; and/or an MBSFN subframe and a non-MBSFN subframe; and/or an SPS subframe and a non-SPS subframe; and/or a subframe with SRS transmission and a subframe without SRS transmission. Preferably, it can be set correspondingly according to different cases, for example, if the plurality of subframes scheduled contain SPS subframes and subframes with aperiodic CSI transmission, the following processing mode can be preset: the SPS can only be scheduled by means of single-frame scheduling; or, activation and release of the SPS can only be scheduled by means of single-frame scheduling, but an SPS subframe in an activated period can be scheduled by means of multi-subframe scheduling; or, aperiodic CSI cannot be triggered through the multi-subframe scheduling; or, the subframes in the multi-subframe scheduling contain SPS and aperiodic CSI subframes, and the SPS and aperiodic CSI subframes are located in preset appointed locations in the subframes scheduled (the appointed locations also can be indicated by the base station to the UE through an indication).

Whether the plurality of subframes scheduled contain the SPS subframe can be judged through a preset condition, for example, whether the DCI is scrambled by SPS RNTI, if it is judged that the DCI is scrambled by the SPS RNTI, it indicates that the plurality of subframes contain the SPS subframe; for another example, whether a location of the SPS subframe is in the plurality of subframes scheduled, if it is judged that the location of the SPS subframe is in the plurality of subframes scheduled, it indicates that the plurality of subframes contain the SPS subframe and so on, and more examples will not be given here.

Alternatively,

When the subframes in the multi-subframe scheduling contain the SPS subframe, and the DCI supports multi-stream transmission, a TB index of the SPS subframe is determined through the following way:

when the DCI supports the multi-stream transmission, data of the SPS correspond to a preset TB index;

or, when the DCI supports the multi-stream transmission, the TB index corresponding to the data of the SPS is determined according to indication signaling of the base station.

When the subframes in the multi-subframe scheduling contain the SPS, a TBS of the SPS subframe is determined through the following way:

the TBS of the SPS subframe and TBSs of the other subframes scheduled are determined according to a preset proportion;

or, the TBS of the SPS subframe is a pre-appointed fixed value.

When the subframes in the multi-subframe scheduling contain UCI or an aperiodic CSI subframe, a TBS of the aperiodic CSI subframe is determined through the following way:

a TBS of a subframe in which the UCI is located and a TBS of a subframe in which aperiodic CSI is located are in a preset proportion relationship with other subframes;

or, it is to preset that the TBS of the subframe in which the aperiodic CSI is located is limited to 0;

or, when the DCI supports the multi-stream transmission, the aperiodic CSI uses a preset fixed codebook and port;

or, the TBS of the subframe in which the UCI is located is a pre-appointed fixed value.

Particularly, in a TDD system, when the base station performs multi-subframe scheduling, a relationship between a UL DAI and a plurality of subframes scheduled can be preset as that:

the UL DAI corresponds to an HARQ-ACK feedback of the first uplink subframe in the multi-subframe scheduling;

or, the UL DAI corresponds to an uplink subframe corresponding to the largest number of downlink subframes in the plurality of uplink subframes scheduled;

or, the UL DAI is applied to all uplink subframes, each subframe corresponds to a preset same value;

or, the UL DAI corresponds to a preset group of DAI values.

In the TDD system, when the base station performs multi-subframe scheduling, a DL DAI value can be preset as that: corresponding to an initial subframe scheduled, DL DAI values of subframes scheduled subsequently are acquired by calculating from a DL DAI of the initial subframe by means of accumulation, and after exceeding a preset scheduling window, a recalculation is made.

It should be noted that, here the examples with regard to the way of the base station side and the UE pre-appointing the multi-subframe scheduling mode and scheduling parameters are not exhaustive examples, the skilled in the art can be inspired to acquire more ways for setting the scheduling mode and scheduling parameters according to the examples in the embodiments of the present document, but all these are to schedule a plurality of uplink subframes or downlink subframes at a time through a piece of DCI based on the present document, which belongs to the protection scope of the present document.

In the step 101, the UE acquiring the multi-subframe scheduling mode and scheduling parameters is: the base station sending the multi-subframe scheduling mode and scheduling parameters to the UE in advance through upper layer signaling, that is, the base station side sends the set multi-subframe scheduling mode and scheduling parameters to the UE through the upper layer signaling when the base station side triggers a plurality of subframes through the DCI. The way for setting the multi-subframe scheduling mode and scheduling parameters is identical with the way for the base station side and the UE pre-appointing the multi-subframe scheduling mode and scheduling parameters, but here it is set at the base station side, which will not be repeated here.

In the step 101, the UE acquiring the multi-subframe scheduling mode and scheduling parameters is: the base station side indicating through the DCI, parameters of the DCI itself such as an MSC, DAI and TBS and so on all can be the scheduling parameters; moreover, a plurality of bits can be reserved in advance in the DCI so as to indicate whether it is multi-subframe scheduling, or the number of subframes scheduled in continuous multi-subframe scheduling, or subframe intervals of a plurality of subframes scheduled in discontinuous multi-subframe scheduling and the total number of subframes scheduled, or whether different types of subframes in the multi-subframe scheduling are allowed, or selecting scheduled subframes based on a transmission mode and so on. The examples here are not exhaustive examples, and the skilled in the art can be inspired to acquire more scheduling mode and scheduling parameters according to the above examples.

It should be noted that, in the embodiments of the present document, the implementation of the specific way for the UE acquiring the multi-subframe scheduling mode and scheduling parameters can include one, or any two, or a combination of three of the following: the base station side and the UE making an appointment in advance, or the base station side sending to the UE in advance through the upper layer signaling, or the base station side indicating through the DCI. Correspondingly, which mode for the parameter will be adopted is not limited in the present document, and the skilled in the art can easily select and determine according to the practical situation.

The method of the embodiments of the present document will be described in detail in combination with the specific embodiments below. It should be noted that the embodiments in the present document and the characteristics in the embodiments can be combined with each other in the condition of no conflict.

In the embodiment 1, it is assumed that the base station side and the UE preset, namely appoint, a scheduling mode as that: only continuous subframes can be scheduled in multi-subframe scheduling; moreover, in a subframe n, the base station side indicates a scheduling parameter through DCI, that is, the number of continuous subframes is 4 PDSCHs.

Figure 2:
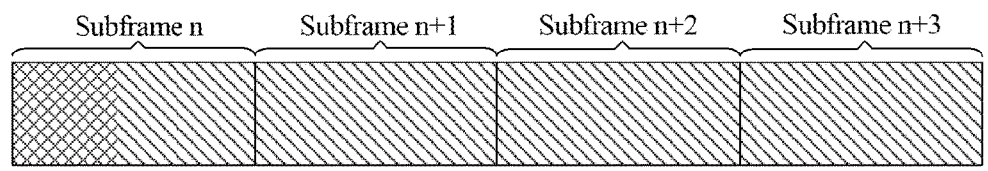
FIG. 2 is a schematic diagram of subframes according to the embodiment 1, embodiment 5, embodiment 6 and embodiment 10 of the present document.

As shown in FIG. 2, after receiving the DCI from the base station side, according to the preset scheduling mode, and according to an indication of the DCI of the base station side, the UE receives PDSCHs in four continuous subframes: subframe n, subframe n+1, subframe n+2 and subframe n+3. In FIG. 2, a grid shade area is a PDCCH, wherein the DCI is borne, and a slash shade area is a PDSCH.

In the embodiment 2, it is assumed that the base station side and the UE preset a scheduling mode as that: discontinuous subframes are allowed to be scheduled in multi-subframe scheduling; moreover, in a subframe n, the base station side indicates that a scheduling parameter is scheduling 4 PDSCHs through DCI, and an interval between individual PDSCHs is 1 subframe.

Figure 3:
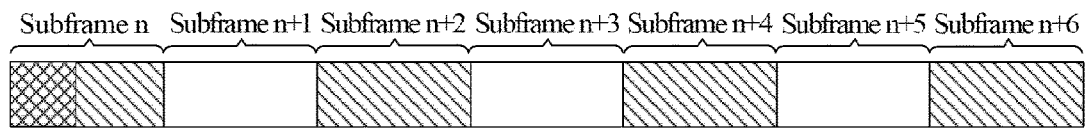
FIG. 3 is a schematic diagram of subframes according to the embodiment 2 of the present document.

As shown in FIG. 3, after receiving the DCI from the base station side, according to the preset scheduling mode, and according to an indication of the DCI of the base station side, the UE receives PDSCHs in the subframe n, subframe n+2, subframe n+4 and subframe n+6. In FIG. 3, a grid shade area is a PDCCH, wherein the DCI is borne, and a slash shade area is a PDSCH.

In the embodiment 3, it is assumed that the base station side and the UE preset, namely appoint, a scheduling mode as that: only continuous subframes can be scheduled in multi-subframe scheduling; moreover, in a subframe n, the base station side indicates a scheduling parameter through DCI, that is, the number of continuous subframes is 4 PUSCHs.

Similar to the embodiment 1, after receiving the DCI from the base station side, according to the preset scheduling mode, and according to an indication of the DCI of the base station side, the UE sends PUSCHs in four continuous subframes: subframe n, subframe n+1, subframe n+2 and subframe n+3.

In the embodiment 4, it is assumed that the base station side and the UE preset a scheduling mode as that: discontinuous subframes are allowed to be scheduled in multi-subframe scheduling; moreover, in a subframe n, the base station side indicates that a scheduling parameter is scheduling 4 PUSCHs through DCI, and an interval between individual PUSCHs is 1 subframe.

Similar to the embodiment 2, after receiving the DCI from the base station side, according to the preset scheduling mode, and according to an indication of the DCI of the base station side, the UE sends PUSCHs in the subframe n, subframe n+2, subframe n+4 and subframe n+6.

In the embodiment 5, it is assumed that, in a subframe n, the base station side indicates that a scheduling mode is scheduling continuous subframes and the number of continuous subframes is 4 PDSCHs through DCI, moreover, it also indicates that MCSs of the 4 PDSCHs all keep identical in the DCI. Here, it can be indicated by using reserved fixed bits in the DCI, for example, a certain fixed bit 1 represents that the multi-subframe scheduling mode is scheduling continuous subframes, and another two fixed bits 11 represent that the number of continuous subframes is 4 and so on, the specific implementation is easily conceived by the skilled in the art, and it is also technical means commonly used by the skilled in the art, which will not be repeated here.

As shown in FIG. 2, after receiving the DCI from the base station side, according to an indication of the DCI of the base station, and with the same MCS, the UE receives PDSCHs in the subframe n, subframe n−1, subframe n+2 and subframe n+3.

In the embodiment 6, it is assumed that, in a subframe n, the base station side indicates to schedule 4 continuous PDSCHs through DCI, and according to an indication of the DCI, it is assumed that an MCS of a PDSCH in the subframe n is 4, an MCS of a PDSCH in a subframe n−1 is 10, an MCS of a PDSCH in a subframe n+2 is 16, and an MCS of a PDSCH in a subframe n+3 is 24.

As shown in FIG. 2, after receiving the DCI from the base station side, according to the indication of the DCI of the base station, and with the MCS as 4 in the subframe n, the MCS as 10 in the subframe n+1, the MCS as 16 in the subframe n+2 and the MCS as 24 in the subframe n+3, the UE receives PDSCHs in the subframe n, subframe n+1, subframe n+2 and subframe n+3.

In the embodiment 7, it is assumed that, in a subframe n, the base station side indicates to schedule 4 continuous PUSCHs through DCI, and according to an indication of the DCI, it is assumed that an MCS of a PDSCH in the subframe n is 4, an MCS of a PDSCH in a subframe n−1 is 10, an MCS of a PDSCH in a subframe n+2 is 16, and an MCS of a PDSCH in a subframe n+3 is 24.

Therefore, after receiving the DCI from the base station side, according to the indication of the DCI of the base station, and with the MCS as 4 in the subframe n, the MCS as 10 in the subframe n−1, the MCS as 16 in the subframe n+2 and the MCS as 24 in the subframe n+3, the UE sends PUSCHs in the subframe n, subframe n−1, subframe n+2 and subframe n+3.

In the embodiment 8, it is assumed that, in a subframe n, the base station side indicates to schedule 4 continuous PDSCHs through DCI, and according to an indication of the DCI, frequency domain locations of a PDSCH in the subframe n are PRB0 to PRB3, frequency domain locations of a PDSCH in a subframe n−1 are PRB4 to PRB7, frequency domain locations of a PDSCH in a subframe n+2 are PRB12 to PRB15, and frequency domain locations of a PDSCH in a subframe n+3 are PRB16 to PRB19.

Figure 4:
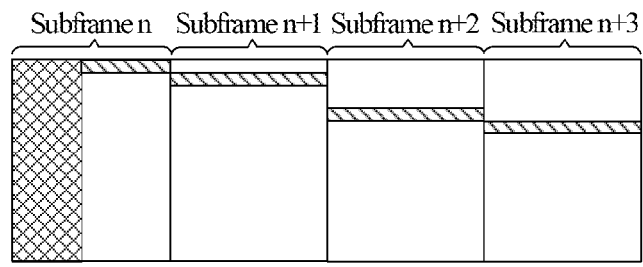
FIG. 4 is a schematic diagram of subframes according to the embodiment 8 of the present document.

As shown in FIG. 4, after receiving the DCI from the base station side, according to the indication of the DCI of the base station, and in locations of the PRB0 to PRB3 in the subframe n, PRB4 to PRB7 in the subframe n+1, PRB12 to PRB15 in the subframe n+2 and PRB16 to PRB19 in the subframe n+3, the UE receives PDSCHs in the subframe n, subframe n+1, subframe n+2 and subframe n+3. In FIG. 4, a grid shade area is a PDCCH, wherein the DCI is borne, and a slash shade area is a PDSCH.

In the embodiment 9, it is assumed that, in a subframe n, the base station side indicates to schedule 4 continuous PUSCHs through DCI, and according to an indication of the DCI, frequency domain locations of a PUSCH in the subframe n are PRB0 to PRB3, frequency domain locations of a PUSCH in a subframe n−1 are PRB4 to PRB7, frequency domain locations of a PUSCH in a subframe n+2 are PRB12 to PRB15, and frequency domain locations of a PUSCH in a subframe n+3 are PRB16 to PRB19.

Similar to the embodiment 8, after receiving the DCI from the base station side, according to the indication of the DCI of the base station, and in locations of the PRB0 to PRB3 in the subframe n, PRB4 to PRB7 in the subframe n+1, PRB12 to PRB15 in the subframe n+2 and PRB16 to PRB19 in the subframe n+3, the UE sends PUSCHs in the subframe n, subframe n−1, subframe n+2 and subframe n+3.

In the embodiment 10, it is assumed that, in a subframe n, the base station side indicates to schedule 4 continuous PDSCHs through DCI, and it is assumed that, in scheduling parameters preset by the base station side and the UE, an MCS of a PDSCH in the subframe n is 4, an MCS of a PDSCH in a subframe n−1 is 10, an MCS of a PDSCH in a subframe n+2 is 16, and an MCS of a PDSCH in a subframe n+3 is 24.

As shown in FIG. 2, after receiving the DCI from the base station side, according to the preset scheduling parameters, and with the MCS as 4 in the subframe n, the MCS as 10 in the subframe n−1, the MCS as 16 in the subframe n+2 and the MCS as 24 in the subframe n+3, the UE receives PDSCHs in the subframe n, subframe n−1, subframe n+2 and subframe n+3.

In the embodiment 11, it is assumed that, in a subframe n, the base station side indicates that it is to schedule 4 continuous PUSCHs and MCSs of the 4 continuous PUSCHs scheduled are 20 through DCI; in a subframe n+2, it is assumed that the UE is required to send an uplink periodic SRS, and the base station side and the UE preset that: an MCS of a subframe sending an uplink periodic SRS is lower than an MCS of a subframe not sending a periodic SRS by 1.

Therefore, after receiving the DCI from the base station side, the UE sends PUSCHs in the subframe n, subframe n−1, subframe n+3 with the MCS as 20, and sends a PUSCH in the subframe n+2 with the MCS as 19.

In the embodiment 12, it is assumed that, in a subframe n, the base station side indicates that it is to schedule 4 continuous PUSCHs and MCSs of the 4 continuous PUSCHs scheduled are 19 through DCI; in a subframe n+1, it is assumed that the UE is required to send uplink HARQ-ACK, and the base station side and the UE preset that: an MCS of a subframe sending UCI is lower than an MCS of a subframe not sending UCI by 1.

Therefore, after receiving the DCI from the base station side, the UE sends PUSCHs in the subframe n, subframe n+2, subframe n+3 with the MCS as 20, and sends a PUSCH in the subframe n+1 with the MCS as 19.

In the embodiment 13, it is assumed that, in a subframe n, the base station side indicates that it is to schedule 4 continuous PUSCHs and MCSs of the 4 continuous PUSCHs scheduled are 18 through DCI; in a subframe n−1, it is assumed that the UE is required to send an uplink CQI, and the base station side and the UE preset that: an MCS of a subframe sending UCI is lower than an MCS of a subframe not sending UCI by 1.

Therefore, after receiving the DCI from the base station, the UE sends PUSCHs in the subframe n, subframe n+2, subframe n+3 with the MCS as 18, and sends a PUSCH in the subframe n−1 with the MCS as 17.

In the embodiment 14, it is assumed that, in a subframe n, the base station side indicates that it is to schedule 4 continuous downlink subframes and MCSs of the 4 continuous PDSCHs scheduled are 18 through DCI; in a subframe n−1, it is assumed that a PBCH is contained, and the base station side and the UE preset that: an MCS of a subframe containing the PBCH is lower than an MCS of a subframe not containing the PBCH by 1.

Therefore, after receiving the DCI from the base station side, the UE receives PDSCHs in the subframe n, subframe n+2, subframe n+3 with the MCS as 18, and receives a PDSCH in the subframe n+1 with the MCS as 17.

In the embodiment 15, it is assumed that, in a subframe n, the base station side indicates to schedule 4 continuous PUSCHs through DCI; in a subframe n+2, it is assumed that the UE is required to send an uplink periodic SRS, and the base station side and the UE preset that: only the subframes of the same type are scheduled in multi-subframe scheduling, that is, only subframes without SRS sending are scheduled.

Therefore, after receiving the DCI from the base station, the UE sends PUSCHs in the subframe n, subframe n−1, subframe n+3 and subframe n+4 according to an indication of the DCI of the base station.

In the embodiment 16, it is assumed that, in a subframe n, the base station side indicates to schedule 4 continuous PUSCHs through DCI; in a subframe n+2, the UE is required to send an uplink periodic SRS, and the base station side and the UE preset that: different types of subframes can be scheduled in multi-subframe scheduling, that is, subframes with SRS sending or subframes without SRS sending can be scheduled.

Figure 5:
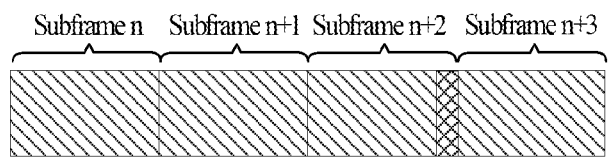
FIG. 5 is a schematic diagram of subframes according to the embodiment 16 of the present document.

As shown in FIG. 5, after receiving the DCI from the base station side, the UE sends PUSCHs in the subframe n, subframe n−1, subframe n+2 and subframe n+3 according to an indication of the DCI of the base station side, wherein, the SRS is sent in the subframe n+2. In FIG. 5, a grid shade area is an SRS, and a slash shade area is a PUSCH.

In the embodiment 17, it is assumed that, in a subframe n, the base station side indicates to schedule 4 continuous downlink subframes through DCI; a subframe n+2 is a Multicast Broadcast Single Frequency Network (MBSFN) subframe, and the base station side indicates to the UE through upper layer signaling that: only the subframes of the same type are scheduled in multi-subframe scheduling, that is, only non-MBSFN subframes are scheduled.

Figure 6:
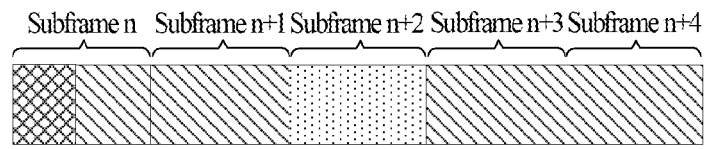
FIG. 6 is a schematic diagram of subframes according to the embodiment 17 of the present document.

As shown in FIG. 6, after receiving the DCI from the base station, the UE receives downlink subframes in the subframe n, subframe n+1, subframe n+3 and subframe n+4 according to an indication of the DCI. In FIG. 6, a grid shade area is a PDCCH. Wherein the DCI is borne, a slash shade area is a PDSCH, and a snowflake shade area is a MBSFN.

In the embodiment 18, it is assumed that, in a subframe n, the base station side indicates to schedule 4 continuous downlink subframes through DCI; a subframe n+2 is an MBSFN subframe, and the base station side indicates to the UE through upper layer signaling that: different types of subframes can be scheduled in multi-subframe scheduling, that is, MBSFN subframes and non-MBSFN subframes can be simultaneously scheduled.

Figure 7:
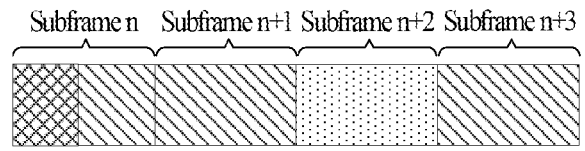
FIG. 7 is a schematic diagram of subframes according to the embodiment 18 of the present document.

As shown in FIG. 7, after receiving the DCI from the base station, the UE receives downlink subframes in the subframe n, subframe n−1, subframe n+2 and subframe n+3 according to an indication of the DCI of the base station, wherein the subframe n+2 is the MBSFN subframe. In FIG. 7, a grid shade area is a PDCCH. Wherein the DCI is borne, a slash shade area is a PDSCH, and a snowflake shade area is a MBSFN.

In the embodiment 19, it is assumed that, in a subframe n, the base station side indicates to schedule 4 continuous downlink subframes through DCI; a subframe n+2 is an MBSFN subframe, and the base station side and the UE preset that: only the subframes of the same type are scheduled in multi-subframe scheduling, that is, only non-MBSFN subframes are scheduled.

As shown in FIG. 6, after receiving the DCI from the base station, the UE receives downlink subframes in the subframe n, subframe n+1, subframe n+3 and subframe n+4 according to an indication of the DCI of the base station side.

In the embodiment 20, it is assumed that, in a subframe n, the base station side indicates to schedule 4 continuous downlink subframes through DCI; a subframe n+2 is an MBSFN subframe, and the base station side and the UE preset that: different types of subframes can be scheduled in multi-subframe scheduling, that is, MBSFN subframes and non-MBSFN subframes can be simultaneously scheduled.

As shown in FIG. 7, after receiving the DCI from the base station, the UE receives downlink subframes in the subframe n, subframe n+1, subframe n+2 and subframe n+3 according to an indication of the DCI of the base station side, wherein the subframe n+2 is the MBSFN subframe.

In the embodiment 21, it is assumed that, in a subframe n, the base station side indicates to schedule 4 continuous downlink subframes through DCI; a subframe n+2 is an MBSFN subframe, and a PDSCH scheduled by the base station is transmitted based on a CRS, at this point, since the MBSFN subframe does not support a transmission mode based on the CRS, a scheduling mode is that MBSFN subframes cannot be scheduled in multi-subframe scheduling.

Therefore, after receiving the DCI from the base station side, the UE receives downlink subframes in the subframe n, subframe n−1, subframe n+3 and subframe n+4 according to an indication of the DCI.

In the embodiment 22, it is assumed that, in a subframe n, the base station side indicates to schedule 4 continuous downlink subframes through DCI; a subframe n+2 is an MBSFN subframe, and a PDSCH scheduled by the base station is transmitted based on a DMRS, at this point, since the MBSFN subframe supports a transmission mode based on the DMRS, MBSFN subframes can be scheduled in multi-subframe scheduling.

Therefore, after receiving the DCI from the base station, the UE receives downlink subframes in the subframe n, subframe n+1, subframe n+2 and subframe n+3 according to an indication of the DCI of the base station side, wherein the subframe n+2 is the MBSFN subframe.

In the embodiment 23, it is assumed that, in a subframe n, the base station side indicates to schedule 4 continuous downlink subframes through DCI; a subframe n+2 is a downlink SPS subframe triggered by the DCI previously, and it is assumed that a scheduling mode preset by the base station side and the UE includes that: SPS subframes can only be scheduled by means of single-subframe, and the multi-subframe scheduling automatically skips the SPS subframes.

Figure 8:
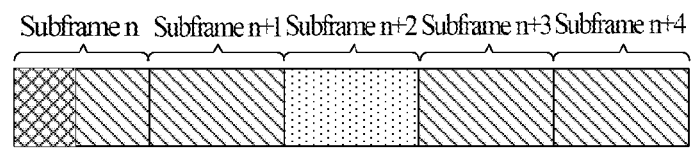
FIG. 8 is a schematic diagram of subframes according to the embodiment 23 of the present document.

As shown in FIG. 8, after receiving the DCI from the base station, and skipping the subframe n+2, the UE receives downlink subframes in the subframe n, subframe n−1, subframe n+3 and subframe n+4 according to an indication of the DCI of the base station side. In FIG. 8, a grid shade area is a PDCCH. Wherein the DCI is borne, a slash shade area is a PDSCH, and a snowflake shade area is SPS.

In the embodiment 24, it is assumed that, in a subframe n, the base station side indicates to schedule 4 continuous downlink subframes through DCI; a subframe n+2 is a downlink SPS subframe triggered by the DCI previously, and it is assumed that a scheduling mode preset by the base station side and the UE is that: activation and release of the SPS can only be scheduled by means of single-subframe, and SPS subframes in an activated period can be scheduled by means of multiple-subframes.

Therefore, after receiving the DCI from the base station side, the UE receives downlink subframes in the subframe n, subframe n+1, subframe n+2 and subframe n+3 according to an indication of the DCI of the base station side, wherein the subframe n+2 is an SPS subframe in an activated period.

In the embodiment 25, it is assumed that, in a subframe n, the base station indicates to schedule 4 continuous downlink subframes through DCI; a subframe n+2 is a downlink SPS subframe required to be triggered, and a scheduling mode preset by the base station side and the UE includes that: activation and release of the SPS can only be scheduled by means of single-subframe, and SPS subframes in an activated period can be scheduled by means of multiple-subframes.

As shown in FIG. 8, in the embodiment, since the subframe n+2 is the downlink SPS subframe required to be triggered, and it belongs to the SPS activation, after receiving the DCI from the base station side, the UE receives downlink subframes in the subframe n, subframe n+1, subframe n+3 and subframe n+4 according to an indication of the DCI of the base station side.

In the embodiment 26, it is assumed that, in a subframe n, the base station indicates to schedule 4 continuous downlink subframes through DCI, and it is assumed that a scheduling mode preset by the base station side and the UE includes that: SPS subframes can be triggered by the multi-subframe scheduling, in the 4 downlink subframes continuously scheduled, it is required to trigger one SPS downlink subframe, and a location of the SPS subframe is fixedly located in the first one of the plurality of subframes scheduled.

Figure 9:
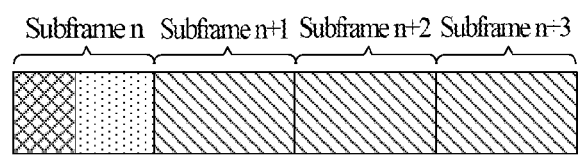
FIG. 9 is a schematic diagram of subframes according to the embodiment 26 of the present document.

As shown in FIG. 9, after receiving the DCI from the base station, the UE receives downlink subframes in the subframe n, subframe n−1, subframe n+2 and subframe n+3 according to an indication of the DCI of the base station side, wherein the subframe n is the SPS downlink subframe triggered by the base station. In FIG. 9, a grid shade area is a PDCCH. Wherein the DCI is borne, a slash shade area is a PDSCH, and a snowflake shade area is SPS.

In the embodiment, it is assumed that a TBS index of the SPS downlink subframe therein used currently is: a TB1 preset by the base station side and the UE, thus a TBS of the SPS downlink subframe is a TBS of the TB1 notified through the DCI.

In the embodiment 27, it is assumed that, in a subframe n, the base station indicates to schedule 4 continuous downlink subframes through DCI, and it is assumed that a scheduling mode preset by the base station side and the UE is that: SPS subframes can be triggered by the multi-subframe scheduling, in the 4 downlink subframes continuously scheduled, it is required to trigger one SPS downlink subframe, and a location of the SPS subframe is fixedly located in the last one of the plurality of subframes scheduled.

Figure 10:
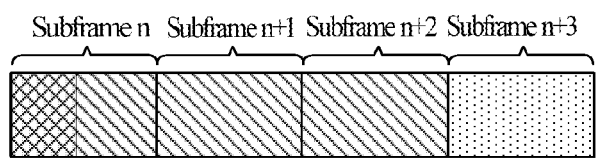
FIG. 10 is a schematic diagram of subframes according to the embodiment 27 of the present document.

As shown in FIG. 10, after receiving the DCI from the base station, the UE receives downlink subframes in the subframe n, subframe n−1, subframe n+2 and subframe n+3 according to an indication of the DCI of the base station side, wherein the subframe n+3 is the SPS downlink subframe triggered by the base station. In FIG. 10, a grid shade area is a PDCCH. Wherein the DCI is borne, a slash shade area is a PDSCH, and a snowflake shade area is SPS.

In the embodiment, it is assumed that a TBS index of the SPS downlink subframe therein used currently is: a TB1 indicated by the base station side through the DCI, thus a TBS of the SPS downlink subframe is a TBS of the TB1 indicated through the DCI.

In the embodiment 28, it is assumed that, in a subframe n, the base station indicates to schedule 4 continuous uplink subframes through DCI, and in the 4 uplink subframes continuously scheduled, it is required to trigger one SPS uplink subframe, it is assumed that a scheduling mode preset by the base station side and the UE includes that: SPS subframes can be triggered by the multi-subframe scheduling, and a scheduling parameter includes that a location of the SPS subframe is fixedly located in the first one of the plurality of subframes scheduled.

Therefore, after receiving the DCI from the base station, the UE sends uplink subframes in the subframe n, subframe n+1, subframe n+2 and subframe n+3 according to an indication of the DCI of the base station side, wherein the subframe n is the SPS uplink subframe triggered by the base station.

In the embodiment, it is assumed that a TBS of the SPS uplink subframe is a fixed value 328 bits preset by the base station side and the UE, thus the UE sends a PUSCH in the subframe n with the 328 bits as the TBS.

In the embodiment 29, it is assumed that, in a subframe n, the base station side indicates to schedule 4 continuous uplink subframes through DCI, and in the 4 uplink subframes continuously scheduled, it is required to trigger one SPS uplink subframe, it is assumed that a scheduling mode preset by the base station side and the UE is that: SPS subframes can be triggered by the multi-subframe scheduling, and in preset scheduling parameters, it is set that a location of the SPS subframe is fixedly located in the last one of the plurality of subframes scheduled.

Therefore, after receiving the DCI from the base station, the UE sends uplink subframes in the subframe n, subframe n+1, subframe n+2 and subframe n+3 according to an indication of the DCI of the base station side, wherein the subframe n+3 is the SPS uplink subframe triggered by the base station.

In the embodiment, it is assumed that the base station side and the UE preset that: a TBS of the SPS uplink subframe is a TBS closest to 1/10 of a TBS of the rest of the scheduled subframes existing in the related TBS table, and it is assumed that the TBS of the rest of the subframes scheduled by the base station is 3240 bits, it is easy to know that 1/10 of 3240 bits is 324 bits, thus the UE takes the 328 bits closest to the 324 bits as the TBS of the SPS subframe in the subframe n, and sends a PUSCH with the 328 bits as the TBS.

In the embodiment 30, it is assumed that, in a subframe n, the base station side indicates to schedule 4 continuous uplink subframes through DCI, and the DCI triggers one aperiodic CSI feedback at present, it is assumed that a scheduling mode preset by the base station side and the UE includes that: aperiodic CSI can be triggered by the multi-subframe scheduling, and preset scheduling parameters include that: the aperiodic CSI is fixedly located in the first one of the plurality of subframes scheduled.

Figure 11:
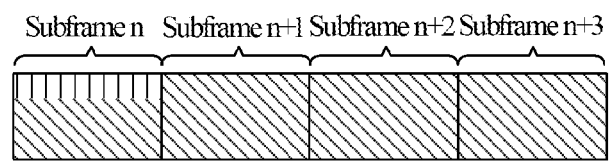
FIG. 11 is a schematic diagram of subframes according to the embodiment 30, embodiment 31 and embodiment 32 of present document.

As shown in FIG. 11, after receiving the DCI from the base station, the UE sends uplink subframes in the subframe n, subframe n−1, subframe n+2 and subframe n+3 according to an indication of the DCI of the base station side, and sends the aperiodic CSI in the subframe n. In FIG. 11, a slash shade area is a PUSCH, and a vertical bar shade area is CSI.

In the embodiment, it is assumed that the base station side and the UE preset that: a TBS of an uplink subframe required to send the aperiodic CSI is a TBS closest to 6/7 of a TBS of the rest of the scheduled subframes existing in the related TBS table, and it is assumed that the TBS of the rest of the subframes scheduled by the base station is 7480 bits, it is easy to know that 6/7 of 7480 bits is 6411 bits, thus the UE takes the 6456 bits closest to the 6411 bits as the TBS of the uplink subframe sending the aperiodic CSI in the subframe n, and sends the uplink subframe with the 6456 bits as a TBS of the subframe n.

In the embodiment 31, it is assumed that, in a subframe n, the base station side indicates to schedule 4 continuous uplink subframes through DCI, and the DCI triggers one aperiodic CSI feedback at present, it is assumed that a scheduling mode preset by the base station side and the UE includes that: aperiodic CSI can be triggered by the multi-subframe scheduling, and a preset scheduling parameter includes that: the aperiodic CSI is fixedly located in the first one of the plurality of subframes scheduled.

As shown in FIG. 11, after receiving the DCI from the base station side, the UE sends uplink subframes in the subframe n, subframe n−1, subframe n+2 and subframe n+3 according to an indication of the DCI of the base station, and sends the aperiodic CSI in the subframe n.

In the embodiment, it is assumed that the base station and the UE preset that: a TBS of an uplink subframe required to send the aperiodic CSI is 0, thus the UE sends the uplink subframe with the 0 bit as a TBS of the subframe n.

In the embodiment 32, it is assumed that, in a subframe n, the base station side indicates to schedule 4 continuous uplink subframes through DCI, and the DCI triggers one aperiodic CSI feedback at present, it is assumed that a scheduling mode preset by the base station side and the UE includes that: aperiodic CSI can be triggered by the multi-subframe scheduling, and preset scheduling parameters include that: the aperiodic CSI is fixedly located in the first one of the plurality of subframes scheduled.

As shown in FIG. 11, after receiving the DCI from the base station, the UE sends uplink subframes in the subframe n, subframe n−1, subframe n+2 and subframe n+3 according to an indication of the DCI of the base station side, and sends the aperiodic CSI in the subframe n.

In the embodiment, it is assumed that the base station and the UE preset that: a TBS fixed value of an uplink subframe required to send the aperiodic CSI is 7992 bits, thus the UE sends the uplink subframe with the 7992 bits as a TBS of the subframe n.

In the embodiment 33, it is assumed that, in a TDD system, in a subframe n, the base station side indicates to schedule 4 uplink subframes through DCI (whether to be continuous can be acquired according to the presetting or an instruction, which is not limited in the embodiment), and the base station side and the UE preset that: a DAI in the DCI is a DAI of the first subframe of the plurality of subframes scheduled.

Therefore, after receiving the DCI from the base station side, the UE takes a DAI domain therein as the number of HARQ-ACKs required to be fed back corresponding to the first uplink subframe of the 4 uplink subframes scheduled to feed back the HARQ-ACKs.

In the embodiment 34, it is assumed that, in a TDD system, in a subframe n, the base station side indicates to schedule 4 uplink subframes through DCI (whether to be continuous can be acquired according to the presetting or an instruction, which is not limited in the embodiment), and the base station side and the UE preset that: a DAI in the DCI is the number of HARQ-ACKs required to be fed back by a subframe with the largest number of HARQ-ACKs in the plurality of subframes scheduled.

Therefore, after receiving the DCI from the base station side, the UE takes a DAI domain therein as the number of HARQ-ACKs of a subframe with the largest number of HARQ-ACKs in the 4 uplink subframes scheduled to feed back the HARQ-ACKs.

In the embodiment 35, it is assumed that, in a TDD system, in a subframe n, the base station side indicates to schedule 4 uplink subframes through DCI (whether to be continuous can be acquired according to the presetting or an instruction, which is not limited in the embodiment), and the base station side and the UE preset that: a DAI in the DCI corresponds the number of HARQ-ACKs required to be fed back by all the subframes scheduled.

Therefore, after receiving the DCI from the base station side, the UE takes a DAI domain therein as the number of HARQ-ACKs of all the uplink subframes scheduled to feed back the HARQ-ACKs.

In the embodiment 36, it is assumed that, in a TDD system, in a subframe n, the base station side indicates to schedule 4 uplink subframes through DCI (whether to be continuous can be acquired according to the presetting or an instruction, which is not limited in the embodiment), and the base station side and the UE preset that: a DAI domain in the DCI corresponds to a certain group of predefined HARQ-ACK numbers, it is assumed that bits of a DAI domain in the related DCI is 01, the corresponding predefined HARQ-ACK numbers is (1, 2, 1, 3). Here, a certain group refers to: a value of a group of predefined HARQ numbers.

Therefore, after receiving the DAI domain in the DCI from the base station side, the UE takes (1, 2, 1, 3) as the number of HARQ-ACKs of the 4 uplink subframes scheduled to feed back the HARQ-ACKs.

In the embodiment 37, it is assumed that, in a TDD system, in a subframe n, the base station side indicates to schedule 4 downlink subframes through DCI (whether to be continuous can be acquired according to presetting or an instruction, which is not limited in the embodiment), and the base station side and the UE preset that: a DAI domain in the DCI corresponds to a DAI of the first subframe of the 4 downlink subframes scheduled, the rest of the subframes are acquired by calculating from the DAI of the first subframe by means of accumulation. The DAI domain in the DCI indicated as 00 is taken as an example in the embodiment.

Therefore, after the UE receives the DCI from the base station side, according to the DAI domain therein, a DAI of the subframe n is 00, DAIs of the 3 subframes scheduled subsequently are respectively acquired by accumulation from 00, it is easy to acquire that: a DAI of a subframe n−1 is 01, a DAI of a subframe n+2 is 10, and a DAI of a subframe n+3 is 11.

It should be noted that, the embodiments of the present document are not exhaustive examples, the skilled in the art can be inspired to acquire more embodiments according to the schematic embodiments of the present document, but all the embodiments are to schedule a plurality of uplink subframes or downlink subframes at a time through a piece of DCI based on the embodiments of the present document, which belongs to the protection scope of the present document.

Figure 12:
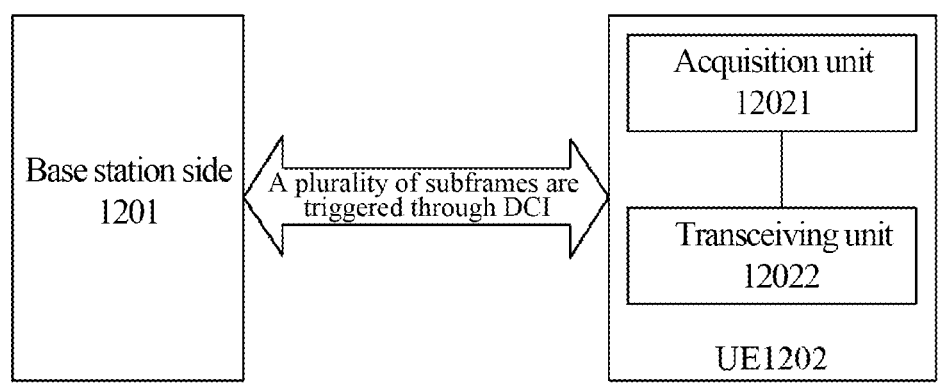
FIG. 12 is a schematic diagram of a composition structure of a multi-subframe scheduling system according to the embodiment of the present document.

With respect to the method of the embodiment of present document, a multi-subframe scheduling system is also provided, and as shown in FIG. 12, a base station side 1201 and a user equipment (UE) 1202 are included, wherein, the base station side is used to schedule transmission of a plurality of subframes through a piece of DCI; and the UE 1202 is configured to: according to the acquired multi-subframe scheduling mode and scheduling parameters, receive and send the plurality of subframes according to an indication of the DCI.

Preferably, the base station side 1201 is configured to: schedule a plurality of uplink subframes or downlink subframes at a time through a piece of DCI, and send data in a plurality of downlink subframes scheduled, or receive data in a plurality of uplink subframes scheduled.

The UE includes an acquisition unit and a transceiving unit, wherein, the acquisition unit 12021 is configured to: acquire the multi-subframe scheduling mode and scheduling parameters; and the transceiving unit 12022 is configured to: in accordance with the acquired multi-subframe scheduling mode and scheduling parameters, according to the indication of the DCI, receive data of the plurality of downlink subframes scheduled, or send data of the plurality of uplink subframes scheduled.

Wherein, the acquisition unit 12021 is configured to: pre-appoint the multi-subframe scheduling mode and scheduling parameters with the base station side; and/or acquire the multi-subframe scheduling mode and scheduling parameters from the base station side through upper layer signaling; and/or acquire the multi-subframe scheduling mode and scheduling parameters from the indication of the DCI from the base station side.

The embodiment of the present document provides a multi-subframe scheduling device, which is configured at a base station side, and configured to: schedule a plurality of uplink subframes or downlink subframes at a time through a piece of DCI, and make the base station side send data in a plurality of downlink subframes scheduled, or receive data in a plurality of uplink subframes scheduled.

The embodiment of the present document also provides a multi-subframe scheduling device, which is configured at a UE side, and configured to: according to an acquired multi-subframe scheduling mode and scheduling parameters, receive and send a plurality of subframes according to an indication of DCI.

The device includes an acquisition unit and a transceiving unit, wherein, the acquisition unit is configured to: acquire the multi-subframe scheduling mode and scheduling parameters; and the transceiving unit is configured to: in accordance with the acquired multi-subframe scheduling mode and scheduling parameters, according to the indication of the DCI, receive data of a plurality of downlink subframes scheduled, or send data of a plurality of uplink subframes scheduled.

The acquisition unit is configured to: pre-appoint the multi-subframe scheduling mode and scheduling parameters with a base station side; and/or acquire the multi-subframe scheduling mode and scheduling parameters from the base station side through upper layer signaling; and/or acquire the multi-subframe scheduling mode and scheduling parameters from the indication of the DCI from the base station side.

Correspondingly, the embodiment of the present document also provides a multi-subframe scheduling method, which includes: a base station side scheduling a plurality of uplink subframes or downlink subframes at a time through a piece of DCI, and the base station sending data in the plurality of downlink subframes scheduled, or receiving data in the plurality of uplink subframes scheduled.

Or, it includes: in accordance with the acquired multi-subframe scheduling mode and scheduling parameters, according to the indication of the DCI, the UE receiving data of the plurality of downlink subframes scheduled, or sending data of the plurality of uplink subframes scheduled. Wherein, the UE pre-appoints the multi-subframe scheduling mode and scheduling parameter with the base station side; and/or, the UE acquires the multi-subframe scheduling mode and scheduling parameters from the base station side through upper layer signaling; and/or, the UE acquires the multi-subframe scheduling mode and scheduling parameters from the indication of the DCI from the base station side.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or more integrated circuits. Correspondingly, each module/unit in the above examples can be implemented in a form of hardware, and also can be implemented in a form of software function module. The present document is not limited to any combination of hardware and software in a specific form.

The above description is only the preferred examples of the present document, which is not used to limit the protection scope of the present document. All the modifications, equivalent substitutions, and improvements, etc. made within the spirit and principle of the present document shall fall into the protection scope of the present document.

INDUSTRIAL APPLICABILITY

In the present document, by using the multi-subframe scheduling method, control overhead of the scheduling in the base station is reduced, which provides higher spectrum efficiency for users, thereby supporting user transmission with a larger data volume.

What is claimed is:

1. A multi-subframe scheduling method, comprising:
a base station side scheduling transmission of a plurality of subframes through a piece of downlink control information DCI; and
according to an acquired multi-subframe scheduling mode and scheduling parameters, a user equipment UE receiving and sending the plurality of subframes according to an indication of the DCI;
wherein, the scheduling mode is the plurality of subframes scheduled containing different types of subframes, and a way for processing the different types of subframes;
wherein, the way for processing the different types of subframes comprises: only scheduling subframes of a same type in the multi-subframe scheduling, or selecting scheduled subframes based on a transmission mode.

2. The multi-subframe scheduling method according to claim 1, wherein, the base station side scheduling transmission of a plurality of subframes through a piece of DCI comprises:
the base station side scheduling a plurality of uplink subframes or downlink subframes at a time through a piece of DCI; and the base station side sending data in the plurality of downlink subframes scheduled, or receiving data in the plurality of uplink subframes scheduled,
or,
wherein, the UE receiving and sending the plurality of subframes according to an indication of the DCI comprises:
in accordance with the acquired multi-subframe scheduling mode and scheduling parameters, according to the indication of the DCI, the UE receiving data of the plurality of downlink subframes scheduled, or sending data of the plurality of uplink subframes scheduled,
or,
the method further comprises: the UE acquiring the multi-subframe scheduling mode and scheduling parameters, comprising:
the base station side and the UE pre-appointing the multi-subframe scheduling mode and scheduling parameters;
and/or, the base station side sending the multi-subframe scheduling mode and scheduling parameters to the UE through upper layer signaling;
and/or, the base station side indicating the multi-subframe scheduling mode and scheduling parameters in the DCI sent to the UE.

3. The multi-subframe scheduling method according to claim 2, further comprising: the UE acquiring the multi-subframe scheduling mode and scheduling parameters: the base station side and the UE pre-appointing the multi-subframe scheduling mode and scheduling parameters,
or,
the method further comprises: the UE acquiring the multi-subframe scheduling mode and scheduling parameters: the base station side sending the multi-subframe scheduling mode and scheduling parameters to the UE through upper layer signaling,
or,
the method further comprises: the UE acquiring the multi-subframe scheduling mode and scheduling parameters: the base station side indicating the multi-subframe scheduling mode and scheduling parameters in the DCI sent to the UE.

4. The multi-subframe scheduling method according to claim 3, wherein, the scheduling mode is a base station scheduling a plurality of continuous subframes, and the scheduling parameters include a number of subframes scheduled,
or,
wherein, the scheduling mode is a base station scheduling a plurality of discontinuous subframes, and the scheduling parameters include subframe intervals of a plurality of subframes scheduled and a total number of subframes scheduled,
or,
wherein, scheduling parameters of all the subframes scheduled are identical; or,
the base station indicates changes of scheduling parameters of user data in different subframes through the indication of the DCI,
or, wherein, the UE and the base station side pre-appoint an adjustment step size and an adjustment condition for the scheduling parameters; the method further comprises:

the UE automatically adjusting the scheduling parameters according to the adjustment step size, according to the adjustment condition;

when the base station schedules the UE to receive a physical downlink shared channel PDSCH, the base station adjusting parameters of a plurality of PDSCHs scheduled according to the adjustment condition, and the UE receiving the PDSCH according to an appointment with the base station.

5. The multi-subframe scheduling method according to claim 3, wherein, the different types of subframes mean that: signal contents borne by the subframes are different, or types of subframes are different, or, wherein, the different types of subframes comprise: a subframe with uplink control information UCI transmission and a subframe without UCI transmission; and/or a multicast broadcast single frequency network MBSFN subframe and a non-MBSFN subframe; and/or a semi-persistence scheduling SPS subframe and a non-SPS subframe; and/or a subframe with sounding reference signal SRS transmission and a subframe without SRS transmission.

6. The multi-subframe scheduling method according to claim 5, wherein, the plurality of subframes scheduled contain SPS subframes and subframes with aperiodic channel state information CSI transmission;

the scheduling mode is that: the SPS subframe can only be scheduled by means of single-frame scheduling; or, activation and release of the SPS subframe can only be scheduled by means of single-frame scheduling, but an SPS subframe in an activated period can be scheduled by means of multi-subframe scheduling; or, aperiodic CSI cannot be triggered through the multi-subframe scheduling; or, the subframes in the multi-subframe scheduling contain SPS and aperiodic CSI subframes, and the SPS and aperiodic CSI subframes are located in preset appointed locations in the subframes scheduled, or, the method further comprises: according to a preset condition, determining whether the plurality of subframes scheduled contain the SPS subframe;

the preset condition comprises: whether the DCI is scrambled by semi-persistence scheduling radio network temporary identification SPS RNTI; a way for determining comprises: if it is judged that the DCI is scrambled by the SPS RNTI, the plurality of subframes containing the SPS subframe; and the preset condition comprises: whether a location of the SPS subframe is in the plurality of subframes scheduled; a way for determining comprises: if it is judged that the location of the SPS subframe is in the plurality of subframes scheduled, the plurality of subframes containing the SPS subframe, or, wherein, when the subframes in the multi-subframe scheduling contain the SPS subframe, and the DCI supports multi-stream transmission, a way for determining a transport block TB index of the SPS subframe comprises:

data of the SPS subframe corresponding to a preset TB index; or, the base station side indicating the TB index corresponding to the data of the SPS subframe through signaling, or, wherein, the subframes in the multi-subframe scheduling contain the SPS subframe, a way for determining a transport block size TBS of the SPS subframe comprises:

the TBS of the SPS subframe and TBSs of the other subframes scheduled being determined according to a preset proportion; or, the TBS of the SPS subframe being a pre-appointed fixed value, or, wherein, when the subframes in the multi-subframe scheduling contain UCI or an aperiodic CSI subframe, a way for determining a TBS of the aperiodic CSI subframe comprises:

a TBS of a subframe in which the UCI is located and a TBS of a subframe in which aperiodic CSI is located being in a preset proportion relationship with the other subframes scheduled; or, being preset as 0; or, when the DCI supports multi-stream transmission, using a preset fixed codebook and port; or, the TBS of the subframe in which the UCI is located being a pre-appointed fixed value.

7. The multi-subframe scheduling method according to claim 3, wherein, in a time division duplexing TDD system, an uplink downlink assignment index UL DAI and the plurality of subframes scheduled satisfy that:

the UL DAI corresponds to a positive acknowledgement information HARQ-ACK feedback of a physical downlink shared channel of a first uplink subframe in the multi-subframe scheduling;

or, the UL DAI corresponds to an uplink subframe corresponding to a largest number of downlink subframes in the plurality of uplink subframes scheduled;

or, the UL DAI is applied to all uplink subframes, each subframe corresponds to a preset same value;

or, the UL DAI corresponds to a preset group of downlink assignment index DAI values, or, wherein, in the TDD system, a downlink assignment index DL DAI value corresponds to an initial subframe scheduled;

DL DAI values of subframes scheduled subsequently are acquired by calculating from a DL DAI of the initial subframe by means of accumulation, and after exceeding a preset scheduling window, a recalculation is made.

8. A multi-subframe scheduling system, comprising: a base station side and a user equipment UE, wherein, the base station side is configured to: schedule transmission of a plurality of subframes through a piece of downlink control information DCI; and the UE is configured to: according to an acquired multi-subframe scheduling mode and scheduling parameters, receive and send the plurality of subframes according to an indication of the DCI;

wherein, the multi-subframe scheduling mode is the plurality of subframes scheduled containing different types of subframes, and a way for processing the different types of subframes;

wherein, the way for processing the different types of subframes comprises: only scheduling subframes of a same type in the multi-subframe scheduling, or selecting scheduled subframes based on a transmission mode.

9. The multi-subframe scheduling system according to claim 8, wherein,
the base station side is configured to: schedule a plurality of uplink subframes or downlink subframes at a time through a piece of DCI, and send data in the plurality of downlink subframes scheduled, or receive data in the plurality of uplink subframes scheduled,
or,
wherein, the UE comprises a processor configured to
acquire the multi-subframe scheduling mode and scheduling parameters;
in accordance with the acquired multi-subframe scheduling mode and scheduling parameters, according to the indication of the DCI, receive data of the plurality of downlink subframes scheduled, or send data of the plurality of uplink subframes scheduled,
preferably, wherein, the processor is configured to: pre-appoint the multi-subframe scheduling mode and scheduling parameters with the base station side; and/or acquire the multi-subframe scheduling mode and scheduling parameters from the base station side through upper layer signaling; and/or acquire the multi-subframe scheduling mode and scheduling parameters from the indication of the DCI from the base station side.

10. A multi-subframe scheduling method, comprising: a base station side scheduling a plurality of uplink subframes or downlink subframes at a time through a piece of downlink control information DCI, and the base station sending data in the plurality of downlink subframes scheduled, or receiving data in the plurality of uplink subframes scheduled;
wherein, a scheduling mode used by the base station side is that a plurality of subframes scheduled contain different types of subframes, and only subframes of a same type in the multi-subframe scheduling are scheduled, or scheduled subframes are selected based on a transmission mode.

11. The multi-subframe scheduling method according to claim 10, further comprising: the UE acquiring the multi-subframe scheduling mode and scheduling parameters, comprising:
the base station side and the UE pre-appointing the multi-subframe scheduling mode and scheduling parameters;
and/or, the base station side sending the multi-subframe scheduling mode and scheduling parameters to the UE through upper layer signaling;
and/or, the base station side indicating the multi-subframe scheduling mode and scheduling parameters in the DCI sent to the UE.

12. A multi-subframe scheduling method, comprising: in accordance with an acquired multi-subframe scheduling mode and scheduling parameters, according to an indication of downlink control information DCI, a user equipment UE receiving data of a plurality of downlink subframes scheduled, or sending data of a plurality of uplink subframes scheduled;
wherein, the scheduling mode is the plurality of subframes scheduled containing different types of subframes, and a way for processing the different types of subframes;
wherein, the way for processing the different types of subframes comprises: only scheduling subframes of a same type in the multi-subframe scheduling, or selecting scheduled subframes based on a transmission mode.

13. The multi-subframe scheduling method according to claim 12, further comprising: the UE acquiring the multi-subframe scheduling mode and scheduling parameters, comprising:
the UE pre-appointing the multi-subframe scheduling mode and scheduling parameters with a base station side; and/or,
the UE acquiring the multi-subframe scheduling mode and scheduling parameters from the base station side through upper layer signaling; and/or,
the UE acquiring the multi-subframe scheduling mode and scheduling parameters from the indication of the DCI from the base station side.

14. The multi-subframe scheduling method according to claim 12, further comprising: the UE acquiring the multi-subframe scheduling mode and scheduling parameters: the base station side and the UE pre-appointing the multi-subframe scheduling mode and scheduling parameters,
or,
the method further comprises: the UE acquiring the multi-subframe scheduling mode and scheduling parameters: the base station side sending the multi-subframe scheduling mode and scheduling parameters to the UE through upper layer signaling,
or,
the method further comprises: the UE acquiring the multi-subframe scheduling mode and scheduling parameters: the base station side indicating the multi-subframe scheduling mode and scheduling parameters in the DCI sent to the UE.

15. The multi-subframe scheduling method according to claim 14, wherein, the scheduling mode is a base station scheduling a plurality of continuous subframes, and the scheduling parameters include a number of subframes scheduled,
or,
wherein, the scheduling mode is a base station scheduling a plurality of discontinuous subframes, and the scheduling parameters include subframe intervals of a plurality of subframes scheduled and a total number of subframes scheduled,
or,
wherein, scheduling parameters of all the subframes scheduled are identical; or,
the base station indicates changes of scheduling parameters of user data in different subframes through the indication of the DCI,
or,
wherein, the UE and the base station side pre-appoint an adjustment step size and an adjustment condition for the scheduling parameters; the method further comprises:
the UE automatically adjusting the scheduling parameters according to the adjustment step size, according to the adjustment condition;
when the base station schedules the UE to receive a physical downlink shared channel PDSCH, the base station adjusting parameters of a plurality of PDSCHs scheduled according to the adjustment condition, and the UE receiving the PDSCH according to an appointment with the base station.

16. The multi-subframe scheduling method according to claim 14, wherein, the scheduling mode is the plurality of subframes scheduled containing different types of subframes, and a way for processing the different types of subframes.

17. The multi-subframe scheduling method according to claim 16, wherein, the way for processing the different types of subframes comprises: only scheduling subframes of a same type in the multi-subframe scheduling, or selecting scheduled subframes based on a transmission mode.

18. The multi-subframe scheduling method according to claim 17, wherein, the different types of subframes mean that: signal contents borne by the subframes are different, or types of subframes are different, or, wherein, the different types of subframes comprise: a subframe with uplink control information UCI transmission and a subframe without UCI transmission; and/or a multicast broadcast single frequency network MBSFN subframe and a non-MBSFN subframe; and/or a semi-persistence scheduling SPS subframe and a non-SPS subframe; and/or a subframe with sounding reference signal SRS transmission and a subframe without SRS transmission.

19. The multi-subframe scheduling method according to claim 18, wherein, the plurality of subframes scheduled contain SPS subframes and subframes with aperiodic channel state information CSI transmission;

the scheduling mode is that: the SPS subframe can only be scheduled by means of single-frame scheduling; or, activation and release of the SPS subframe can only be scheduled by means of single-frame scheduling, but an SPS subframe in an activated period can be scheduled by means of multi-subframe scheduling; or, aperiodic CSI cannot be triggered through the multi-subframe scheduling; or, the subframes in the multi-subframe scheduling contain SPS and aperiodic CSI subframes, and the SPS and aperiodic CSI subframes are located in preset appointed locations in the subframes scheduled, or, the method further comprises: according to a preset condition, determining whether the plurality of subframes scheduled contain the SPS subframe;

the preset condition comprises: whether the DCI is scrambled by semi-persistence scheduling radio network temporary identification SPS RNTI; a way for determining comprises: if it is judged that the DCI is scrambled by the SPS RNTI, the plurality of subframes containing the SPS subframe; and the preset condition comprises: whether a location of the SPS subframe is in the plurality of subframes scheduled; a way for determining comprises: if it is judged that the location of the SPS subframe is in the plurality of subframes scheduled, the plurality of subframes containing the SPS subframe, or, wherein, when the subframes in the multi-subframe scheduling contain the SPS subframe, and the DCI supports multi-stream transmission, a way for determining a transport block TB index of the SPS subframe comprises:

data of the SPS subframe corresponding to a preset TB index; or, the base station side indicating the TB index corresponding to the data of the SPS subframe through signaling, or, wherein, the subframes in the multi-subframe scheduling contain the SPS subframe, a way for determining a transport block size TBS of the SPS subframe comprises:

the TBS of the SPS subframe and TBSs of the other subframes scheduled being determined according to a preset proportion; or, the TBS of the SPS subframe being a pre-appointed fixed value, or, wherein, when the subframes in the multi-subframe scheduling contain UCI or an aperiodic CSI subframe, a way for determining a TBS of the aperiodic CSI subframe comprises:

a TBS of a subframe in which the UCI is located and a TBS of a subframe in which aperiodic CSI is located being in a preset proportion relationship with the other subframes scheduled; or, being preset as 0; or, when the DCI supports multi-stream transmission, using a preset fixed codebook and port; or, the TBS of the subframe in which the UCI is located being a pre-appointed fixed value.

20. The multi-subframe scheduling method according to claim 14, wherein, in a time division duplexing TDD system, an uplink downlink assignment index UL DAI and the plurality of subframes scheduled satisfy that:

the UL DAI corresponds to a positive acknowledgement information HARQ-ACK feedback of a physical downlink shared channel of a first uplink subframe in the multi-subframe scheduling;

or, the UL DAI corresponds to an uplink subframe corresponding to a largest number of downlink subframes in the plurality of uplink subframes scheduled;

or, the UL DAI is applied to all uplink subframes, each subframe corresponds to a preset same value;

or, the UL DAI corresponds to a preset group of downlink assignment index DAI values, or, wherein, in the TDD system, a downlink assignment index DL DAI value corresponds to an initial subframe scheduled;

DL DAI values of subframes scheduled subsequently are acquired by calculating from a DL DAI of the initial subframe by means of accumulation, and after exceeding a preset scheduling window, a recalculation is made.

* * * * *